United States Patent
Chen et al.

(10) Patent No.: US 11,789,834 B2
(45) Date of Patent: Oct. 17, 2023

(54) COMPUTER AND CONDUIT FOR SYSTEM TESTING

(71) Applicant: Visa International Service Association, San Francisco, CA (US)

(72) Inventors: Yuexi Chen, Foster City, CA (US); Kiat Chun Tan, Singapore (SG); Mochammed Iqbal Pakeh, Kecamatan batam Kota (ID); Baoxiang Kang, Singapore (SG); Arlene Yap Bernas, Singapore (SG); Si Xiang Lim, Singapore (SG)

(73) Assignee: Visa International Service Association, San Francisco, CA (US)

( * ) Notice: Subject to any disclaimer, the term of this patent is extended or adjusted under 35 U.S.C. 154(b) by 101 days.

(21) Appl. No.: 17/420,266

(22) PCT Filed: Dec. 31, 2019

(86) PCT No.: PCT/US2019/069100
§ 371 (c)(1),
(2) Date: Jul. 1, 2021

(87) PCT Pub. No.: WO2020/142512
PCT Pub. Date: Jul. 9, 2020

(65) Prior Publication Data
US 2022/0091949 A1    Mar. 24, 2022

Related U.S. Application Data

(60) Provisional application No. 62/787,593, filed on Jan. 2, 2019.

(51) Int. Cl.
*G06F 11/00* (2006.01)
*G06F 11/263* (2006.01)
(Continued)

(52) U.S. Cl.
CPC ........ *G06F 11/263* (2013.01); *G06F 11/2221* (2013.01); *G06F 11/2273* (2013.01); *G06F 11/2733* (2013.01)

(58) Field of Classification Search
CPC .............. G06F 11/263; G06F 11/2221; G06F 11/2273; G06F 11/2733; G06F 11/261; G06F 11/3664
See application file for complete search history.

(56) References Cited

U.S. PATENT DOCUMENTS

| | | |
|---|---|---|
| 5,724,273 A | 3/1998 | Desgrousilliers et al. |
| 8,788,885 B1 | 7/2014 | Cook et al. |

(Continued)

FOREIGN PATENT DOCUMENTS

| | | |
|---|---|---|
| KR | 20110104480 A | 9/2011 |
| KR | 20160101117 A | 8/2016 |

(Continued)

OTHER PUBLICATIONS

PCT/US2019/069100, "International Search Report and Written Opinion", dated Apr. 27, 2020, 10 pages.
(Continued)

*Primary Examiner* — Joseph D Manoskey
(74) *Attorney, Agent, or Firm* — Kilpatrick Townsend & Stockton LLP

(57) ABSTRACT

A method for testing an interaction system response to different types of interaction devices is disclosed. A testing computer can execute various sets of interaction device logic during different test interaction. The testing computer can electronically communicate with an access device during test interaction through a conduit mobile device. As a result, the testing computer can electronically communicate with the access device even when the testing computer is remotely located.

20 Claims, 5 Drawing Sheets

(51) Int. Cl.
    *G06F 11/22*     (2006.01)
    *G06F 11/273*     (2006.01)

(56) References Cited

U.S. PATENT DOCUMENTS

| | | | |
|---|---|---|---|
| 2009/0209250 A1* | 8/2009 | Huq | H04L 43/50 455/425 |
| 2010/0224682 A1* | 9/2010 | Busch-Sorensen | H04L 9/3278 235/492 |
| 2013/0098984 A1 | 4/2013 | Shenker et al. | |
| 2015/0025946 A1 | 1/2015 | Hammad et al. | |
| 2021/0133135 A1* | 5/2021 | Wen | H04W 4/80 |
| 2022/0365867 A1* | 11/2022 | Deza | H04W 24/06 |

FOREIGN PATENT DOCUMENTS

| | | |
|---|---|---|
| KR | 20180117334 A | 10/2018 |
| WO | 2013119862 | 8/2013 |
| WO | 2018144036 A1 | 8/2018 |

OTHER PUBLICATIONS

EP19907431.1, "Extended European Search Report", dated Feb. 1, 2022, 11 pages.
"NFC Forum Compliant Dynamic Tag", Available online at: https://datasheet.octopart.com/AS3956-ATDM-S4-amsdatasheet-150739193.pdf, Nov. 14, 2018, pp. 1-107.
EP19907431.1, "Office Action", dated Feb. 14, 2023, 12 pages.

\* cited by examiner

COMPUTER AND CONDUIT FOR SYSTEM TESTING

CROSS-REFERENCE TO RELATED APPLICATIONS

This application is a National Stage of International Application No. PCT/US2019/069100, filed on Dec. 31, 2021, which claims the benefit of U.S. Provisional Application No. 62/787,593, filed Jan. 2, 2019, which are herein incorporated by reference in their entirety for all purposes.

BACKGROUND

There are many types of interaction devices (e.g., contactless cards, contact cards, phones, fobs, etc.), and each interaction device provides different pieces of information when conducting an interaction with, for example, an access device (e.g., an access gate, a point of sale terminal, etc.). Additionally, the same interaction device may provide different types of information during different interaction scenarios. For example, physical contact-based interactions may involve different communications than contactless communication-based interactions.

It is often desirable to verify that an access device can correctly process interactions for each type of interaction device and each interaction scenario. This can mean running hundreds or even thousands of test interactions at the access device to ensure total compatibility. Typically, a different interaction device with a specific logic and configuration is used for each test interaction.

This presents a problem, as it is burdensome to create and distribute a batch of test interaction devices to each remotely located access device. For example, there are thousands if not millions of access devices around the world, and providing multiple test interaction devices at each of those access devices is burdensome. Additionally, it is difficult to identify error trends associated with access devices on a global scale, since each interaction is conducted separately in a remote location. Further, in conventional systems, a skilled technician is needed to manually run each test and make sure everything is working properly at each access device test location. It may be difficult to locate qualified technicians to test all access devices within a specific country or countries.

Furthermore, in some instances, multiple different types of interaction devices can be included into one test device. The test device is then deployed to each access device to perform test interactions according to the multiple different types of interaction devices. However, test devices are still required to be deployed to each access device for testing. Additionally, the deployment of these test devices can be a security risk. For example, if one test device is compromised, data relating to interaction protocols associated with different types of interaction devices can be compromised.

Embodiments of the invention address these problems and other problems, individually and collectively.

SUMMARY

One embodiment is related to a method comprising: receiving, by a testing computer, an interaction input message from a mobile device. The mobile device may have previously received the interaction input message from an access device for an interaction. The mobile device can be in short-range communication with the access device. The method also includes determining, by the testing computer, using a set of logic emulating a specific type of interaction device, an interaction output message based on the interaction input message. The method further includes transmitting, by the testing computer, the interaction output message to the mobile device, wherein the mobile device forwards the interaction output message to the access device.

Another embodiment is related to a testing computer comprising: a processor; a memory; and a computer-readable medium coupled to the processor, the computer-readable medium comprising code executable by the processor for implementing at least the above-described method.

Another embodiment includes a method. The method comprises receiving an interaction input message from an access device for an interaction. The access device is in short-range communication with the mobile device. The method also includes transmitting the interaction input message to a testing computer. The testing computer receives an interaction output message from the testing computer, and determines, using a set of logic emulating a specific type of interaction device. The interaction output message can be based on the interaction input message. The method also includes providing the interaction output message to the access device.

Another embodiment includes a mobile device comprising: a processor; a memory; and a computer-readable medium coupled to the processor. The computer-readable medium comprises code executable by the processor for implementing at least the above-described method.

Further details regarding embodiments of the invention can be found in the Detailed Description and the Figures.

DETAILED DESCRIPTION

Figure 1:
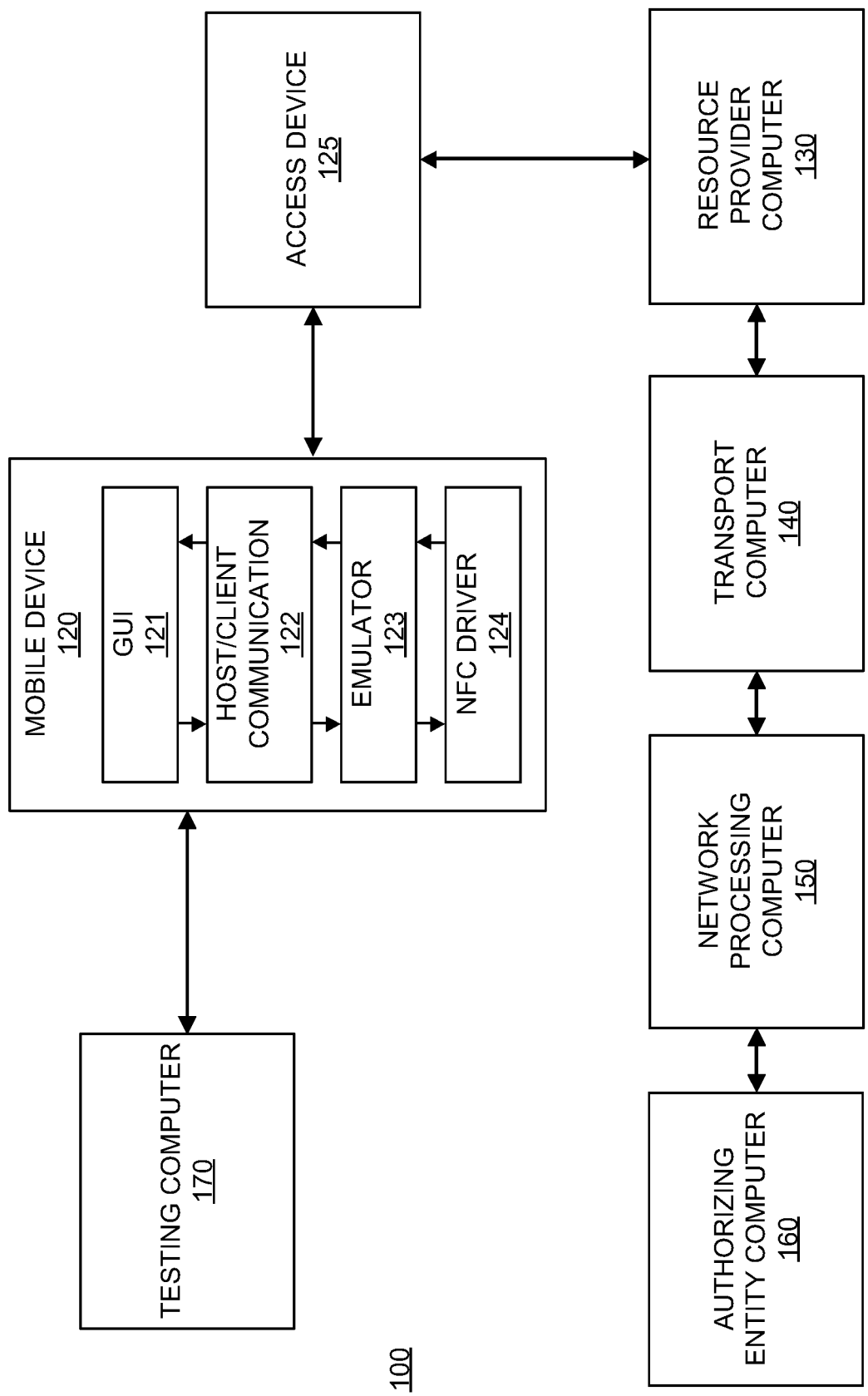
FIG. 1 shows a block diagram of an interaction system according to embodiments.

Embodiments can include a testing system that can remotely test different interaction device types and interaction scenarios at different access devices. In embodiments, a testing computer, which can be remotely located with respect to an access device and can store and execute logic for multiple types of interaction devices. While the testing computer may be remotely located with respect to the access device being tested, the testing computer can effectively communicate directly with the access device through a mobile device, which can act as a conduit or bridge between the access device and the testing device. For example, a mobile device (e.g., a personal mobile device of a store manager) that is already physically located near a given access device can communicate with both the access device (e.g., via NFC (near-field communication) or other short-range communications) and the testing computer (e.g., via long-range over-the-air communications) at the same time. The mobile device can pass various messages (e.g., APDU messages) between the testing computer and the access device.

Accordingly, embodiments allow various types of interaction devices to be tested at an access device without having to physically distribute a test interaction device to the location of the access device. A remotely-located testing computer and local mobile device can, in combination, replace an entire batch of special test interaction devices, thereby reducing the burden and time needed to generate and distribute a batch of physical interaction devices. Additionally, embodiments of the invention can be conducted by an unskilled technician, since during the testing process, the mobile device operator only needs to place a mobile device that is loaded with the appropriate software proximate to the access device. Accordingly, embodiments further advantageously eliminate the need to have a skilled technician at the location of the access device which is to be tested.

Embodiments additionally allow the testing computer to simulate the operation of a defective interaction device using faulty logic messages (e.g., emulating a malfunctioning interaction device) to test an access device. For example, in embodiments, messages with incorrect information, bad formatting, or any other suitable error can be sent from a testing device to an access device to be tested via a mobile device. As a result, the testing system can test how an access device, as well as other components in an interaction system, reacts and behaves to communications from a defective interaction device.

The testing computer according to embodiments can observe and store the responses and behaviors of a remotely located access device (as well as any other devices in the system). The testing computer can also analyze the data to determine trends and/or systemic issues with respect to that access device as well as any other access devices that the testing computer is testing. This can be beneficial. For example, access devices at different resources providers or merchants may be tested, and the trend may indicate that a particular access device model associated with a particular manufacturer is defective. A trend such as this would not have been identified in the conventional method as quickly as in embodiments of the invention.

Prior to discussing specific embodiments of the invention, some terms may be described in detail.

A "user" may include an individual. In some embodiments, a user may be associated with one or more personal accounts and/or interaction devices. The user may also be referred to as a cardholder, account holder, or consumer in some embodiments.

An "interaction device" may include an apparatus that can interact with another device. For example, an interaction device can interact with an access device in order to conduct an interaction. An interaction device may provide information to the access device in order to pay for an interaction such as a transaction, identify a user, gain access to an area (whether physical or virtual) or protected information, identify or obtain a service or product, etc. Examples of interaction devices include payment devices, membership devices, access cards, identification devices, etc. Interaction devices can be proximity-based, vicinity-based, and can take any suitable form (e.g., a mobile device such as a contactless smart card, NFC sticker, mobile phone, payment ring, wearable device, etc.). Interaction device "logic" can include the computer code. The logic can include instructions for interacting with an access device to conduct an interaction. Embodiments allow interaction device logic to be stored and executed by other computers besides interaction devices (e.g., by testing computers).

A "testing computer" can include a computer that can determine whether or not objectives are being met. In some embodiments, a testing computer can determine whether or not objectives are being met by performing a test (e.g., an interaction test). In some embodiments, a testing computer can transmit data to an access device via a mobile device to determine whether or not the access device is operating correctly. This can be based on, for example, a response from the access device that is in response to the data transmitted by the testing computer to the access device. In some embodiments, a testing computer can perform any suitable operation performed by an interaction device.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which devices can interact to facilitate a payment.

"Interaction data" can include data related to an interaction. In some embodiments, interaction data can be transaction data. Transaction data can comprise a plurality of data elements with data values associated with a transaction. In some embodiments, interaction data can include identifiers, credentials, amounts, dates, times, etc.

An "interaction input message" may be a communication received during an interaction. For example, a message sent by an access device may be an interaction input message for a receiving interaction device. One example of an interaction input message can include an APDU (application protocol data unit) command.

An "interaction output message" may be a communication sent during an interaction that is responsive to an interaction input message. One example of an interaction output message can include an APDU response sent by an interaction device, in response to receiving an APDU command.

A "test interaction" may be an investigative interaction. In some embodiments, a test interaction may be conducted to determine information about how an interaction system is functioning. For example, different test interactions can be designed to determine whether or not interactions will be processed correctly when initiated by different types of interaction devices. A test interaction can involve sending certain types of information during an interaction communication session, to an access device, in order to test how the information is processed. Some test interactions can be designed to check for errors in interaction processing. For example, some test interactions can check the response from the access device or an interaction system when a testing computer provides incorrect information for an interaction. A properly functioning access device would provide a predicated response (e.g., a certain error message) after receiving the incorrect information).

An "interaction report" may include information related to one or more prior interactions. An interaction report can have a description of how the interaction was processed. For example, an interaction report can have information that was sent and received, and whether the interaction was successful. An interaction report can also include notes about problems, missing information, delays, or other issues that took place during the interaction.

An "authorization request message" may be an electronic message that requests authorization. In some embodiments, the authorization request message may be an electronic message that requests authorization for an interaction. In some embodiments, the authorization request message may be sent to a network processing computer and/or an issuer of a payment card to request authorization for an interaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCW (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS (point-of-sale) equipment) that indicates approval of the transaction. The code may serve as proof of authorization.

An "authorizing entity" may be an entity that authorizes a request. Examples of authorizing entities may include an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

An "I/O buffer" (e.g., input/output buffer) can be a mechanism for temporarily holding data until it is ready to be used. For input data, the I/O buffer may serve as a queue for holding data until a processor is ready to process a next piece of data. This may allow for a mismatch of the rate of the input data arriving and the rate at which the processor can process the data. On the output side of the I/O buffer, the I/O buffer may also serve as a queue for holding data until the processor is ready to process the next piece of data. As an illustrative example, for an audio application, where an audio speaker can receive data at 40 kilohertz, but the processor can output the audio data at megahertz speeds or greater. The I/O buffer can allow the processor to write the audio data rapidly into the buffer, and then the audio system (e.g., a speaker) can read the audio data from the buffer at the correct speed needed for appropriate audio frequencies.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

FIG. 1 shows an system 100 comprising a number of components. The system 100 comprises a mobile device 120 which can be operated by a user. The mobile device 120 can be in communication with a testing computer 170 and an access device 125. The system 100 can further comprise a resource provider computer 130, a transport computer 140, a network processing computer 150, and an authorizing entity computer 160, each of which may be embodied by one or more computers. The testing computer 170 can be in operative communication with the mobile device 120. The mobile device 120 can be in operative communication with the access device 125, which in turn, can be in operative communication with the resource provider computer 103. The resource provider computer 130 can be in operative communication with the transport computer 140. The transport computer 140 can be in operative communication with the network processing computer 150 which can be in operative communication with the authorizing entity computer 160.

The devices shown may all be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

In some embodiments, the system 100 can be an interaction system. In other words, an interaction can be initiated, processed, and approved using the components in the system 100. For example, the testing computer 170 can initiate an interaction by interacting with the access device 125 via the mobile device 120. The testing computer 170 may establish communications with the mobile device 120 through an internet channel (e.g., TCP/IP (transmission control protocol/internet protocol)). The mobile device 120 may establish communications with the access device 125 via contact or short-range contactless communication such as NFC (near field communications). The access device 125 and the testing computer 170 may exchange one or more messages, such that the access device 125 can obtain interaction data from the testing computer 170. The access device 125 can provide the interaction data to the resource provider computer 130. The resource provider computer 130 can then generate and send an authorization request message with the interaction data to the authorizing entity computer 160. This request can be routed through the transport computer 140 and the network processing computer 150. The authorizing entity computer 160 can determine whether or not to authorize the interaction and return an authorization response message to the resource provider computer 130 and the access device 125. In some embodiments, the access device 125 may perform the above-described functions of both the resource provider computer 130 and the access device 125.

The resource provider computer 130 may be associated with a resource provider, which may be an entity that can provide a resource such as goods, services, information, and/or access. Examples of a resource provider include merchants, access devices, secure data access points, etc. A merchant may typically be an entity that engages in interactions and can sell goods or services, or provide access to goods or services.

The resource provider may accept multiple forms of payment (e.g., a payment card or a mobile device) and may use multiple tools to conduct different types of interactions. For example, the resource provider may operate a physical store and use the access device 125 for in-person interactions.

The access device 125 may be any suitable device for communicating with the resource provider computer 130 and for interacting with an interaction device or a testing computer 170 via a mobile device 120. The access device 125 can be in any suitable location such as at the same location as a merchant, and the access device 125 may be in any suitable form. Some examples of access devices include POS devices, cellular phones, PDAs (personal digital assistants), personal computers (PCs), tablet PCs, hand-held specialized readers, set-top boxes, electronic cash registers (ECRs), automated teller machines (ATMs), virtual cash registers (VCRs), kiosks, security systems, access systems, Websites, and the like. Typically, the access device 125 may use any suitable contact or contactless mode of operation to send or receive data from an interaction device.

Figure 2A:
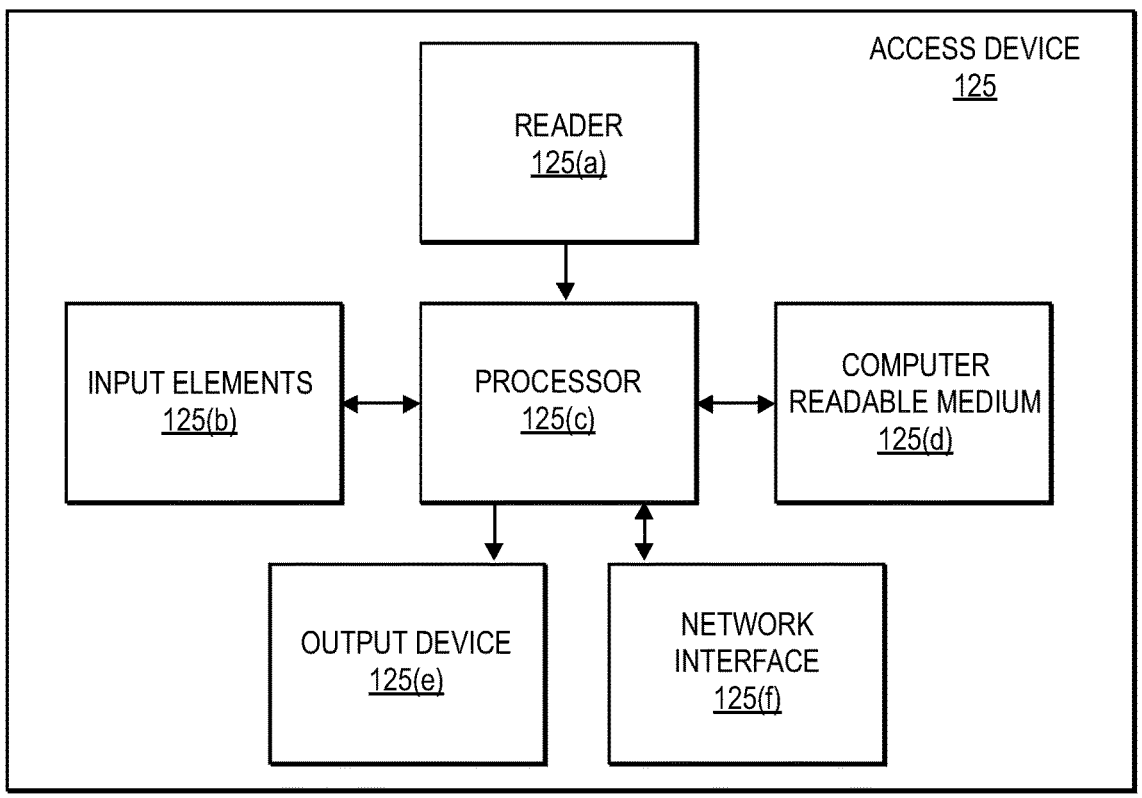
FIG. 2A shows a block diagram of an exemplary access device according to embodiments.

An example of the access device 125, according to some embodiments, is shown in FIG. 2. The access device 125 may comprise a processor 125(c) operatively coupled to a computer readable medium 125(d) (e.g., one or more memory chips, etc.), input elements 125(b) such as buttons or the like, one or more readers 125(a) (e.g., a contact chip reader, a contactless reader, a magnetic stripe reader, etc.), an output device 125(e) (e.g., a display, a speaker, etc.) and a network interface 125(f). A housing may house one or more of these components.

The computer readable medium 125(d) may comprise instructions or code, executable by a processor 125(c). The instructions may include instructions for sending a command to an interaction device or simulation device (e.g., the testing computer 170 via the mobile device 120) upon making contact with that device, and instructions for communicating with the interaction device to obtain credentials and otherwise process the interaction. The computer readable medium 125(d) may also include instructions for authorizing the interaction with the authorizing entity computer 160, and instructions for any other suitable function as described herein.

Referring back to FIG. 1, the transport computer 140 may be associated with an acquirer, which may typically be a business entity (e.g., a commercial bank) that has a business relationship with a particular merchant or other entity. Some entities can perform both issuer and acquirer functions. Some embodiments may encompass such single entity issuer-acquirers. The transport computer 140 may be more specifically referred to as an acquirer computer.

The network processing computer 150 may be disposed between the transport computer 140 and the authorizing entity computer 160. The network processing computer 150 may include data processing subsystems, networks, and operations used to support and deliver authorization services, exception file services, and clearing and settlement services. For example, the network processing computer 150 may comprise a server coupled to a network interface (e.g., by an external communication interface), and databases of information. The network processing computer 150 may be representative of a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The network processing computer 150 may use any suitable wired or wireless network, including the Internet.

The authorizing entity computer 160 may be associated with an authorizing entity, which may be an entity that authorizes a request. An example of an authorizing entity may be an issuer, which may typically refer to a business entity (e.g., a bank) that maintains an account for a user. An issuer may also issue and manage a payment account, or other suitable account, associated with an interaction device and/or a user.

The network processing computer 150, the transport computer 140, and the authorizing entity computer 160 may operate suitable routing tables to route authorization request messages and/or authorization response messages using payment credentials, merchant identifiers, or other account identifiers.

The testing computer 170 may store and/or execute logic associated with different interaction devices in order to perform test interactions. For example, the testing computer 170 may host a different set of logic for each type of interaction device, and instructions for carrying out different test interactions. In addition to testing logic for different types of interaction devices, the testing computer 170 may also be configured to test different conditions of interaction devices and different specific scenarios. For example, the testing computer 170 can perform a test interaction emulating a device in its original state (e.g., a device that has not been used before), and then another test interaction emulating the same device in a state where it has already been used for one or more interactions (e.g., a counter is at 1 or more).

Figure 2B:
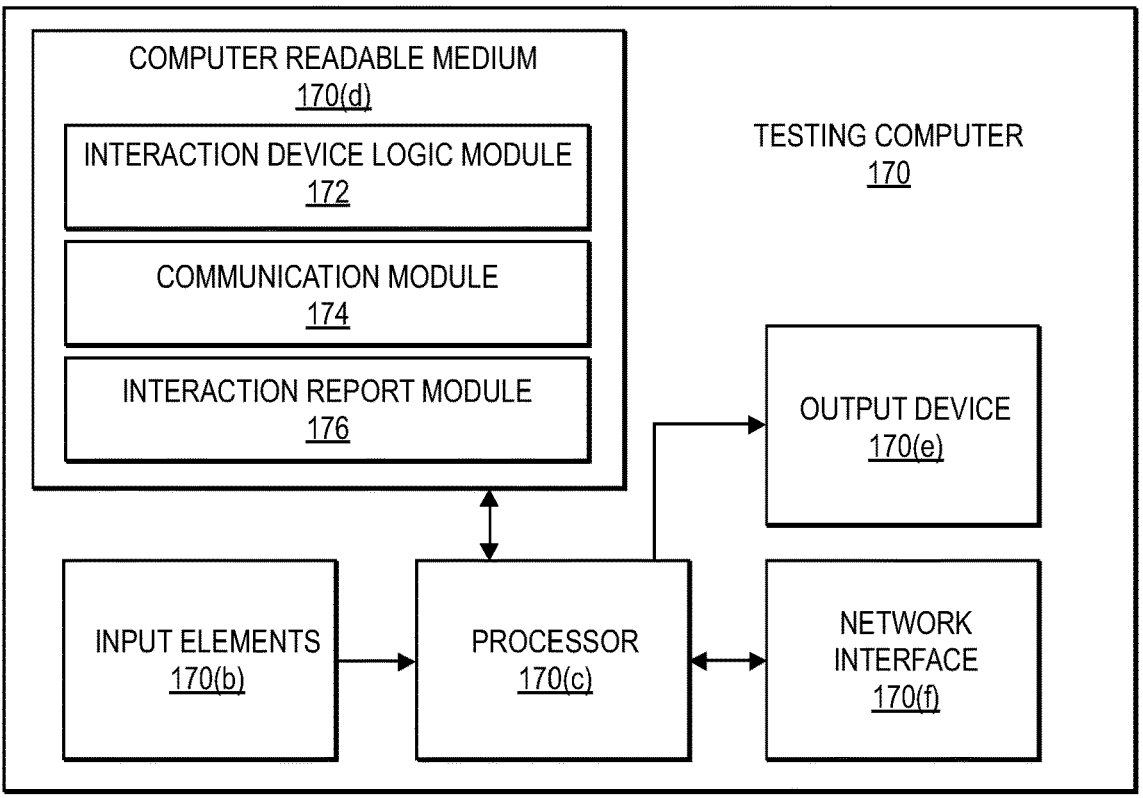
FIG. 2B shows a block diagram of an exemplary testing computer according to embodiments.

An example of the testing computer 170, according to some embodiments, is shown in FIG. 2B. The testing computer 170 may comprise a processor 170(c) operatively coupled to a computer readable medium 170(d) (e.g., one or more memory chips, etc.), input elements 170(b) such as buttons or the like, an output device 125(e) (e.g., a display, a speaker, etc.) and a network interface 170(f). A housing may house one or more of these components. Further, the computer readable medium 170(d) can comprise an interaction device logic module 172, a communication module 174, and an interaction report module 176.

The computer readable medium 170(d) may comprise instructions or code, executable by a processor 170(c). The instructions may include instructions for receiving an interaction input message from a mobile device, wherein the mobile device previously received the interaction input message from an access device for an interaction, the mobile device being in short-range communication with the access device; determining using a set of logic emulating a specific type of interaction device, an interaction output message based on the interaction input message; and transmitting the interaction output message to the mobile device, wherein the mobile device forwards the interaction output message to the access device. In some embodiments, the instructions may include instructions for any other suitable function as described herein.

The interaction device logic module 172 may comprise code or software, executable by the processor 170(d), for emulating interaction device logic. The interaction device logic module 172 in conjunction with the processor 170(d) can receive a selection of an interaction device to simulate (e.g., a contactless payment card using NFC), select logic associated with a particular testing scenario for that selected interaction device, and then generate messages corresponding to the testing scenario and interaction device, and then transmit those messages to the access device to be tested. The interaction device logic module 172, in conjunction with the processor 170(d), can be configured to emulate any suitable interaction device logic which may be stored by the testing computer 170. In some embodiments, the interaction device logic module 172, in conjunction with the processor 170(d), can perform any suitable processing capable of being performed by an interaction device as described herein.

As an illustrative example, the interaction device logic module 172, in conjunction with the processor 170(d), can be configured to emulate an interaction device that is a contactless payment card. For example, the interaction device logic module 172, in conjunction with the processor 170(d), can be configured to perform an interaction with the access device 125 via the mobile device 120, wherein the access device 125 determines that it is communicating with a contactless payment card.

The testing computer 170 may be regularly updated with new or different interaction device logic. Also, in some embodiments, the testing computer 170 may also include a set of predefined input messages and corresponding predefined output messages designed to simulate the logic of one or more interaction devices. For example, the testing computer 170 can simulate logic of an interaction device described herein.

The communication module 174 may comprise code or software, executable by the processor 170(d), for communicating with other devices (e.g., a mobile device 120). The communication module 174, in conjunction with the processor 170(d), can initialize communication channels with a mobile device 120. For example, the communication module 174, in conjunction with the processor 170(d), can initialize any suitable communication channel described herein. In particular, the communication module 174, in conjunction with the processor 170(d), can initialize a TCP/IP communication channel with the mobile device 120. In some embodiments, the communication module 174, in conjunction with the processor 170(d), can further transmit and receive messages from the mobile device 120. For example, the communication module 174, in conjunction with the processor 170(d), can receive an interaction input message from the mobile device 120. The communication module 174, in conjunction with the processor 170(d), can further transmit an interaction output message to the mobile device 120.

The testing computer 170 may remotely communicate with one or more mobile devices 120 (e.g., over-the-air) in order to conduct test interactions at one or more access devices 125 in various locations. For example, the testing computer 170 may send APDU response messages to (and receive APDU command messages from) the access device 125, where each message is routed through the mobile device 120.

The interaction report module 176 may comprise code or software, executable by the processor 170(d), for manipulating test interaction results. For example, the interaction report module 176, in conjunction with the processor 170(d), can be capable of generating an interaction report indicating how an access device functioned during one or more performed interactions. In some embodiments, the interaction report module 176, in conjunction with the processor 170(d), can aggregate data obtained from the responses of one or more interactions associated with one or more access devices into one interaction report.

The testing computer 170 can also store and analyze results of test interactions, such as the types of messages that were sent and received, and how the interaction system behaved in different scenarios. Such data and reports can be generated locally without the help of other devices, because the testing computer 170 can be directly involved in the test interaction and can thereby directly observe test results.

The testing computer 170 can be located in any suitable location. For example, the testing computer 170 may be close to (e.g., within 10 feet) the access device 125, further away but in the same building (e.g., a different room), or in a different building (e.g., miles away).

Referring back to FIG. 1, the mobile device 120 may include circuitry that is used to enable certain device functions, such as telephony. A cellular phone or similar device is an example of a mobile device 120 that may be used in accordance with embodiments. However, other forms or types of devices may be used without departing from embodiments. For example, the mobile device 120 may alternatively be in the form of a key fob, a tablet computer, a laptop, desktop, a wearable device, a vehicle such as a car, etc.

The mobile device 120 may be able to communicate with the access device 125 via contact or contactless communication. Examples of short range wireless communication include NFC, RFID (radio-frequency identification), Bluetooth™, infrared, etc. Additionally, the mobile device 120 may be able to communicate with the testing computer 170 through any suitable means of communication (e.g., via a cellular network, the internet, LAN, WLAN, USB interface, or other physical or wireless interface). In some embodiments, the mobile device 120 may communicate with the testing computer 170 via a long range communication channel.

The mobile device 120 may be operated by a user, and may be brought near to the access device 125 by a user. In some embodiments, the mobile device 120 can be placed nearby the access device 125, such that a user may not need to hold it or operate the mobile device 120 during test interaction processing. In some cases, the mobile device 120 may contact the access device 125 via electric contacts.

The mobile device 120 can serve as a communication conduit between the access device 125 and the testing computer 170. In order to enable this functionality, the mobile device 120 can include one or more software applications and/or hardware components. For example, the mobile device 120 can include a graphical user interface (GUI) 121, a host/client communication module 122 (e.g., a Socket communication module), emulator software 123 (e.g., card emulator software), and an NFC driver 124. The host/client communication module 122 can enable the mobile device 120 to communicate with the testing computer 170 to send and receive APDU messages. The emulator software can enable the mobile device 120 to transmit APDU messages to an NFC driver, which can then transmit messages using NFC to the access device 125. The graphical user interface (GUI) 121 can enable the mobile device 120 to display current operations to a user and to receive user selections. An example GUI 121 can include, for example, a start button, a stop button, an IP-address and port number, a log activation control button, an NFC signal indicator, a TCP/IP connection indicator, and/or any other suitable graphical user interface aiding a user in performing methods as described herein.

One or more software applications and modules can be downloaded onto the mobile device 120, and may be provided by the testing computer 170. Also, some of the applications and modules can be standard features that are already included in some or all mobile devices. Any suitable mobile device 120 can be used, such as a mobile device that belongs to a store location, or a store manager's personal device. Accordingly, the system 100 can operate without having to physically distribute anything (e.g., from a testing facility to a store location).

Embodiments allow different software modules to be used for different scenarios. For example, in a scenario where the mobile device 120 and the access device 125 communicate using Bluetooth instead of NFC, the mobile device 120 can use Bluetooth consumer entity emulation software, or other suitable Bluetooth emulation application and/or Bluetooth capable hardware integrated into the mobile device 120 as known to one of skill in the art.

As mentioned above, the actual interaction messages (e.g., APDU messages) can originate from the testing computer 170, and then can be provided by the mobile device 120 to the access device 125. Accordingly, from the perspective of the access device 125, the mobile device 120 may appear to be a fully functioning interaction device. Embodiments allow the mobile device 120 to have interaction functionality, but during a test interaction, the interaction logic may actually be operating at the testing computer 170.

Different test interactions may be configured to test different interaction scenarios. For example, one test interaction may include logic and instructions to send messages that emulate a normal transaction from a typical type of payment device (e.g., a Visa credit card). The test interaction may be designed to test whether or not the normal transaction is processed correctly. If an authorization response message is received at the access device 125 within a normal timeframe, the system 100 may be considered to be functioning correctly. However, it is possible that the access device 125 or another component in the network is malfunctioning, and an error report may be received or the interaction rejected.

Another test interaction may simulate a malfunctioning payment device. For example, the testing computer 170 may execute logic that causes incorrect information to be sent, or correct information to be sent at an incorrect time to the access device 125. Such logic and test interactions may be run in order to observe how the access device 125 reacts to the malfunctioning payment device emulated by the testing computer 170.

Interactions (e.g., transactions) can involve many messages, many forms of data exchange, and several components interacting in the system 100. Accordingly, many test interactions can be designed that emulate different ways that an interaction device can malfunction, and/or that test how each component in the system handles different situations. The testing computer 170 can execute multiple interactions with the access device 125, via the mobile device 120, in order to run one or more of the different test interactions.

In some embodiments, the testing computer 170 can also receive an interaction report with details about the interaction. For example, the access device 125 can provide the interaction report that describes whether or not the interaction was successfully authorized, and that includes information about any processing errors or delays. In some embodiments, the interaction report may be information provided about authorization results. The testing computer 170 may be able to display the interaction report to a user, thereby informing the user as to the outcome of each test interaction as well as reasons for failure or other issues.

Figure 3A:
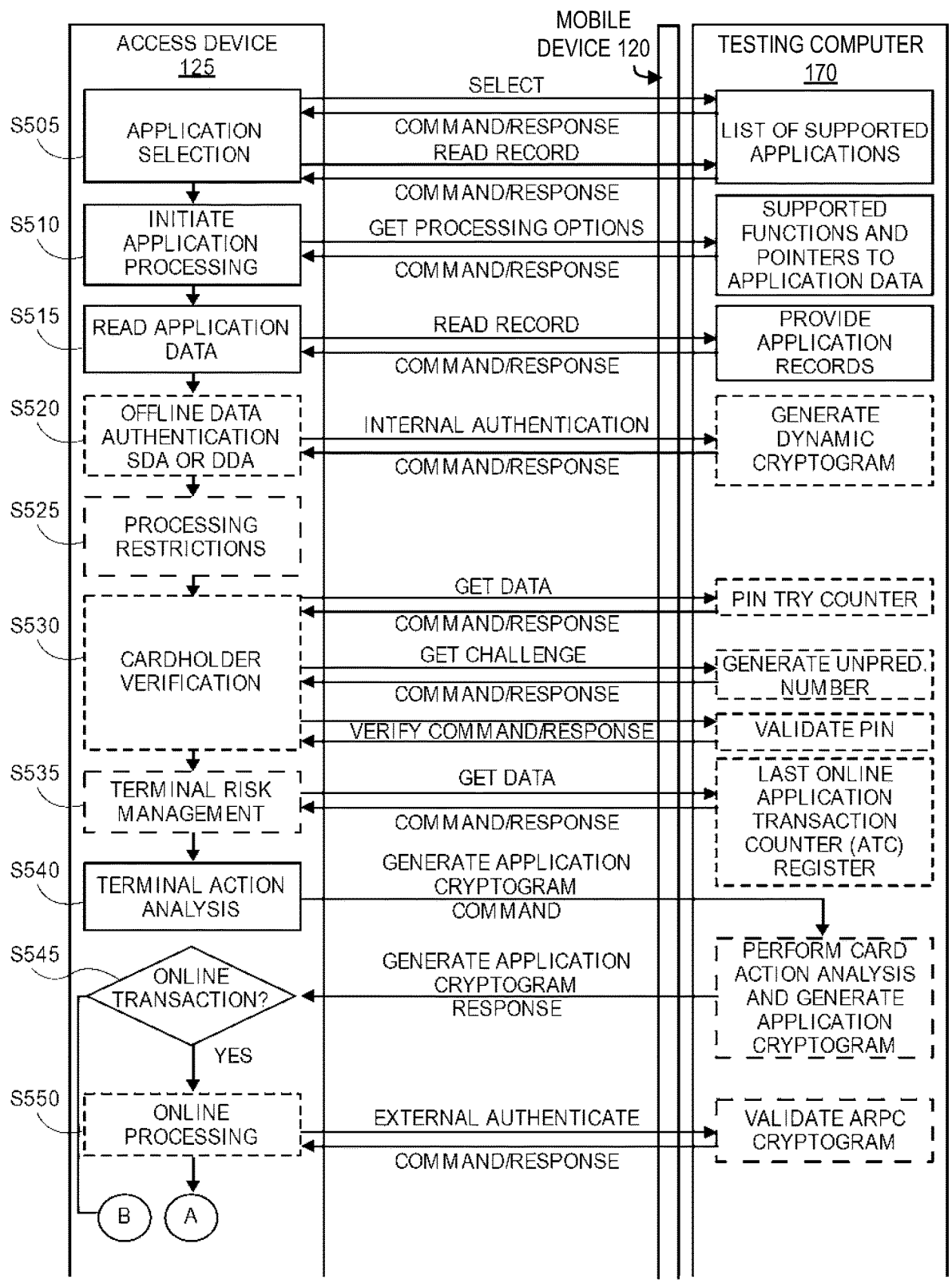
FIGS. 3A-3B show a flow diagram illustrating an example of interaction communications according to embodiments.
Figure 3B:
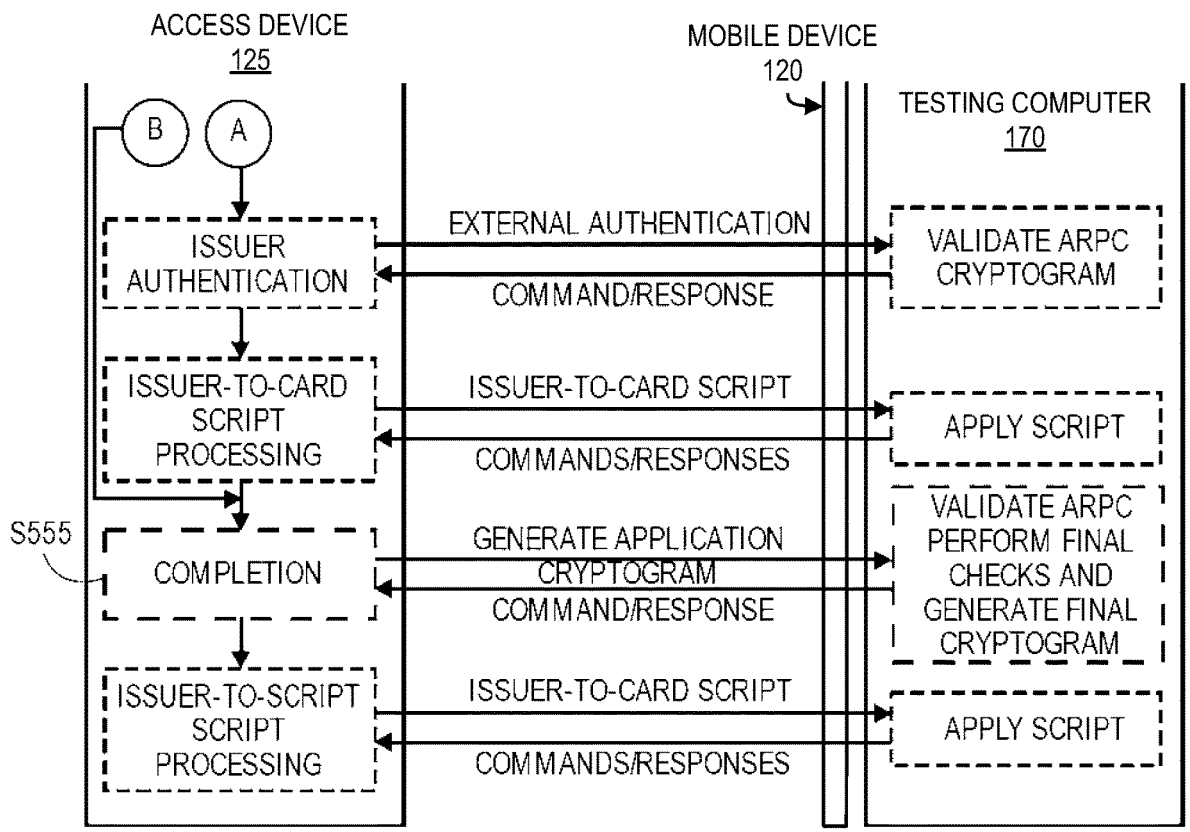

As mentioned herein, interaction communications between the testing computer 170 and the access device 125 (e.g., through the mobile device 120 conduit) can include the exchange of several messages (in addition to messages sent to other components in the system 100). These messages can take the form of APDU (application protocol data unit) messages (e.g., an application protocol data unit command, an application protocol data unit response, etc.). FIGS. 3A-3B, according to embodiments, show an example APDU message exchange between the testing computer 170 and the access device 125, where the communications may pass through a mobile device 120 as described herein, for example, in FIG. 4.

The below APDU message flow is described for an interaction between the testing computer 170, emulating a normally-functioning interaction device, and the access device 125. Embodiments allow an interaction device to be replaced by the testing computer 170, which may emulate a normally-functioning interaction device or a malfunctioning interaction device (e.g., which may not adhere to the messaging flow described below).

When the testing computer 170 contacts (or establishes a contactless communication link with) the access device 125, the testing computer 170 and the access device 125 are then able to communicate and exchange APDU messages. The messages can be in the form of APDU commands sent from the access device 125 to the testing computer 170, and APDU responses sent from the testing computer 170 to the access device 125. However, it should be understood that other messages, messaging protocols, or formats can be used to exchange the relevant information to conduct the interaction.

At step S505, the access device 125 may perform application selection. For example, the access device 125 may determine which applications are supported by both the testing computer 170 and the access device 125. In some embodiments, when the access device 125 detects the presence of the testing computer 170, the access device 125 may send an available applications request (which may be a "select command") to the testing computer 170 to request information on which payment applications (e.g., a list of AIDs) may be available at the testing computer 170.

The testing computer 170 may respond by sending an available applications response back to the access device 125. The available applications response (which may be a "select response") may include a list of available AIDs (application identifiers). An AID may be used to uniquely identify each application (e.g., an EMV or Europay-MasterCard-Visa application) that the access device 125 supports, and each AID may have an associated card scheme and parameters relating to how the application needs to be processed. The access device 125 may contain any number of such applications, and the list of each supported AID is used during, for example, candidate list creation to generate a list of applications that are mutually supported by both the access device and the testing computer 170. In some embodiments, an AID can be formed by the concatenation of a RID (registered application provider identifier) and a PIX (proprietary application identifier extension). In some embodiments, the PIX may be optional, but may normally be present. The RID can be a fixed length unique identifier allocated to each card scheme to identify EMV applications provided by that scheme. The schemes may then suffix the RID with an optional PIX to further differentiate between multiple products supported by the scheme. In some embodiments, together, the RID and PIX may form the AID. The PIX can be an optional, variable length, suffix that may be allocated by card schemes to differentiate between multiple applications (e.g., credit and debit applications) provided by that scheme.

The access device 125 may then select a suitable application from the list of applications received in the available applications response (e.g., by selecting an AID from the available AIDs). The access device 125 may also send an application selection message (which may be a "read record" or "select AID" command) with the selected AID to the testing computer 170.

The testing computer 170 may then send a request (which may be a "read record response") for interaction data to the access device 125 which may be needed to execute the interaction using the selected application/AID. The request may include a list of interaction data identifiers, and the list can be in the form of a processing options data object list (PDOL). The PDOL can be a list of data from the access device 125 that may be utilized by the card, or the testing computer 170, at the beginning of the read application data stage. The access device 125 may utilize the data options list processing rules to format the requested data and then send it to the testing computer 170 in the get processing options request.

At step S510, the access device 125 may initiate application processing. For example, the access device 125 may request that the testing computer 170 indicate the data (e.g., a list of files containing the data) to be used for the selected application and the functions supported. In some embodiments, the access device 125 may send a get processing options (GPO) command. The access device 125 may also provide interaction information to the testing computer 170 (e.g., via the GPO command).

The testing computer 170 may then generate dynamic interaction processing information using at least some of the received terminal interaction data, and send (via a "GPO response") a set of interaction processing information to the access device 125. The interaction processing information may include one or more application file locators (AFLs) that can be used as file addresses by access device 125 to read account data stored on testing computer 170.

At step S515, the access device 125 may read application data. For example, the access device 125 may send an account data request (which may be a "read record command") to the testing computer 170 to read account data stored at the testing computer 170.

The testing computer 170 may then send the account data to the access device 125 (e.g., via a "read record response"). The account data may include, for example, track-2 equivalent data (e.g., an account identifier and/or other payment credentials) and the cardholder name, and/or other account related data that is accessible at the AFL location.

One or more steps of authentication and verification can be performed to validate that the interaction can proceed. For example, steps S515-S540 provide various authentication processes. At step S515, the access device 125 may determine whether it should authenticate the testing computer 170 offline.

At step S525, the access device 125 may check for processing restrictions. Such restrictions can be in any suitable form. For example, the access device 125 may be unable to process interactions involving certain types of interaction devices.

At step S530, the access device 125 may perform cardholder verification. For example, the access device 125 may ask the cardholder or user to enter a PIN, biometric, or other type of authentication data into the access device 125. As shown in FIG. 3A, the testing computer 170 may coordinate a PIN try counter to count the number of times that the user tries to enter authentication data into the access device 125. The testing computer 170 may also generate an unpredictable number, which may be generated and sent to the access device 125 for including in the command response that includes the PIN. The unpredictable number can be used to prevent replay attacks. Lastly, the testing computer may perform a PIN validation process for any PIN that it receives.

At step S535, the access device 125 may perform terminal risk management (e.g., check for signs of fraud). At step S540, the access device 125 may perform a terminal action analysis. For example, the access device may determine whether the interaction should be approved offline, sent online for authorization, or declined offline. In some cases, a counter (ATC or automatic transaction counter) may be used to determine how many interactions may be conducted with an interaction device, before it needs to go online to conduct a transaction. In some embodiments, a certain number of offline interactions (e.g., without communication with an authorizing entity computer) may be conducted by an interaction device before the interaction device must be used online to communicate with an authorizing entity computer.

The access device 125 may then request a cryptogram from the testing computer 170 (e.g., via a generate application cryptogram command). In some embodiments, an authorization request cryptogram (ARQC) may be requested for online authorization, a transaction certificate (TC) may be requested for offline authorization (e.g., already approved offline), and an application authentication cryptogram (AAC) may be requested for a transaction decline or an authorization deferral.

The testing computer 170 may then determine what type of cryptogram to provide to the access device. For example, the testing computer 170 may provide an ARQC to proceed with online authorization. Alternatively, the testing computer 170 may determine that the interaction should be declined, and may return an AAC.

At step S545, the access device 125 may receive the cryptogram from the testing computer 170 and determine whether to authorize the interaction online. In some embodiments, if an ARQC is received, the access device 125 may continue with an online authorization process.

At step S550, having obtained the requisite data, the access device 125 may then process the interaction online. For example the access device 125 may utilize some or all of the obtained data elements (e.g., from the interaction processing information and the account data) to generate an interaction authorization request message to request authorization (e.g., online authorization) of the interaction from the authorizing entity computer such as one operated by an issuer.

The access device 125 may send the authorization request message to the authorizing entity computer via the interaction processing network for authorization (as explained above with respect to FIG. 1). The access device 125 may receive a response with an authorization result and/or information about interaction processing issues.

FIGS. 3A and 3B also shows boxes at the testing computer 170 which indicate "validate ARPC cryptogram." An ARPC cryptogram is an application response cryptogram that is generated by the authorizing entity computer. This cryptogram can be verified by the testing computer 170 (behaving as an interaction device) as proof that the message received from the authorizing entity computer is authentic. FIG. 3B also shows an issuer-to-card script processing box in the access device 125 and an apply script box in the testing computer 170. In these operations, the authorizing entity computer in communication with the access device 125 may provide scripts that the testing computer 170 (behaving as an interaction device) can execute. For example, one script that is sent from an authorizing entity computer to the testing computer 170 via the access device 125 may act to reset a counter on the testing computer 170.

At step S555, the access device 125 may complete the interaction communications with the testing computer 170. This can include providing the authorization result and/or any other interaction processing information to the testing computer 170. The access device 125 may also request a second cryptogram from the testing computer 170 (e.g., using a second generate application cryptogram command). If the interaction was successfully authorized, the access device 125 may indicate this by requesting a transaction certificate (TC). Once the testing computer 170 provides the second cryptogram (e.g., via a command/response), it may complete its internal processing and revert to a default state. The access device 125 and the testing computer 170 (acting as an interaction device) can then be ready for a subsequent interaction.

Embodiments allow the testing computer 170 to execute logic with instructions that emulate this entire exchange, as well as logic that intentionally changes the information or message format for each step (as well as skip a step). From the perspective of the access device 125, a mobile device 120 (e.g., which is forwarding communications from the testing computer 170) is operating in a similar manner as an interaction device.

Figure 4:
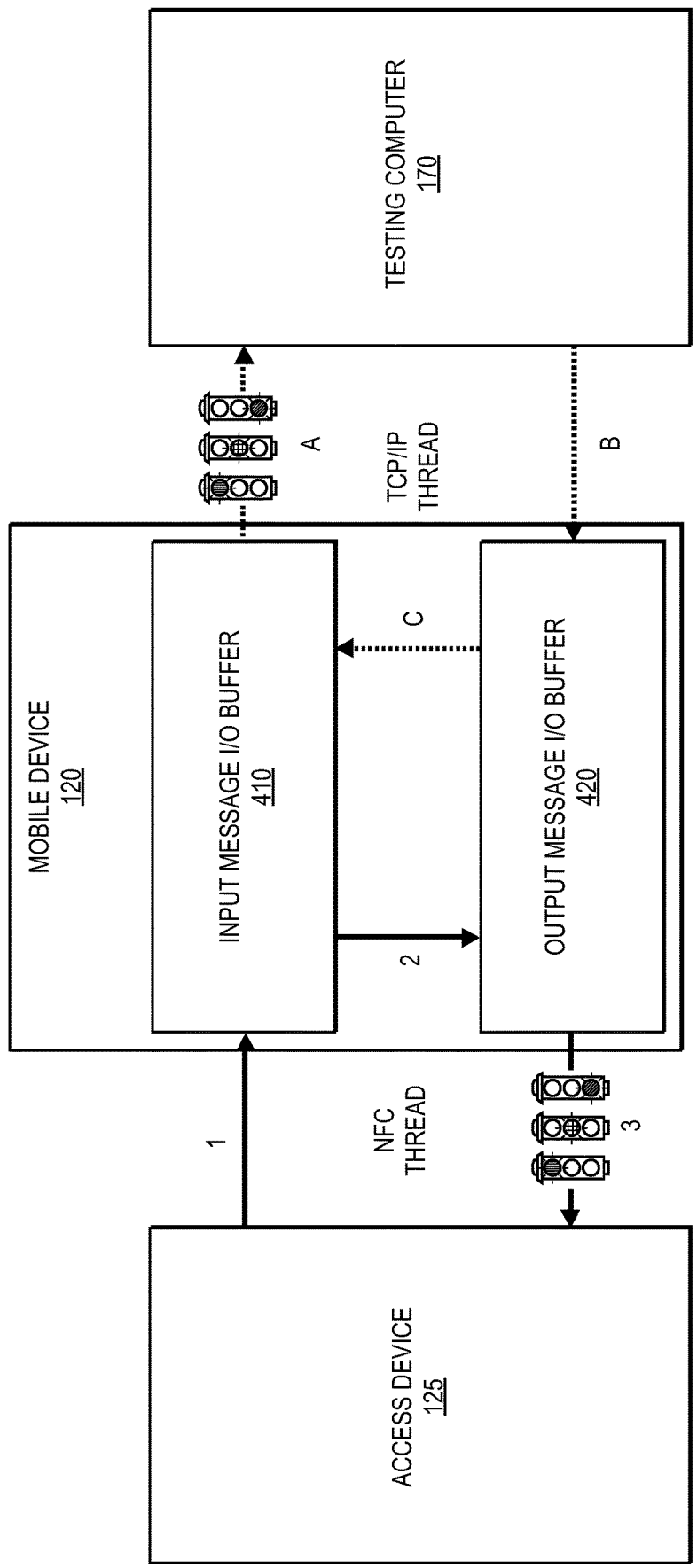
FIG. 4 shows a diagram of an interaction testing method according to embodiments.

A method 400 according to embodiments can be described with respect to FIG. 4. Some elements in other Figures are also referred to. The steps shown in the method 400 may be performed sequentially or in any suitable order in embodiments. In some embodiments, one or more of the steps may be optional. The method described with respect to FIG. 4 includes descriptions of the use of message buffers in a mobile device 120 that is between the testing computer 170 and the access device 125.

The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL). In some embodiments, a request or response may comprise a mix of different message types, such as both email and SMS messages.

The access device 125 and mobile device 120 may both be located at a resource provider location (e.g., a merchant storefront) or other field-testing location. A testing computer 170 with updated and current test interaction instructions and interaction device logic may be located in a central testing facility away from the access device 125 and the mobile device 120.

First, a user (either at the resource provider location or operating the testing computer 170) may select a testing application installed on the mobile device 120. The mobile device 120 can then enter a testing state. The mobile device 120 may inform the user that the mobile device 120 is ready for testing, and may prompt the user to bring the mobile device 120 near to the access device 125 or to contact the access device 125. The user may then present the mobile device 120 to the access device 125 at the resource provider location for one or more test interactions.

Then, the mobile device 120 may establish communication with the access device 125 (e.g., via contact or short-range contactless communication). Once the mobile device 120 establishes communication with the access device 125, the testing computer 170 can automatically conduct a set of test interactions. The testing computer 170 can first initiate an interaction communication session for a first test interaction during which the testing computer 170 may execute a first set of interaction device logic. The first test interaction may be designed to emulate a first type of interaction device. The first test interaction may also be designed to test the resulting actions of the access device 125 in response to communications with the first type of interaction device.

During the interaction communication session, the access device 125 may send several messages to the mobile device 120, and the mobile device 120 may forward each message to the testing computer 170. Also, the testing computer 170 may respond with several messages to the mobile device 120, and the mobile device 120 may forward each response message to the access device 125. These messages can include APDU commands and responses. Steps 1-3 and A-C describe one set of exchanged messages. However, several iterations of message exchange can take place.

As an illustrative example, two concurrent threads may be processed simultaneously by the mobile device 120. A first NFC (near-field communication) thread may process communications between the mobile device 120 and the access device 125. A second TCP/IP (transmission control protocol/Internet protocol) thread may process communications between the mobile device 120 and the testing computer 170. In some embodiments, for example, the NFC thread and the TCP/IP thread may be initially started simultaneously when the mobile device 120 is powered on.

At step 1, of the NFC thread, the access device 125 may send an interaction input message to the mobile device 120. The interaction input message may be an APDU command such as a select command, a read record command, a GPO command, a get data command, a generate application cryptogram command, or any other suitable command. The access device 125 can then transmit the interaction input message to the mobile device 120 via a short-range communication channel. The short-range communication channel may be, for example, an NFC communication channel, a Bluetooth communication channel, an infrared communication channel, an ultra-wideband communication channel, etc. In some embodiments, the NFC thread may be a thread that moves data from the access device 125 to the input message I/O buffer 410. Further, the NFC thread may move data from the output message I/O buffer 420 to the access device 125.

As an illustrative example, the mobile device 120 may sense (e.g., determine) that data is located on an NFC module of the mobile device 120 (e.g., data received from the access device 125). The NFC thread may move the data (e.g., the interaction input message) from the access device 125 to the input message I/O buffer 410. For example, in some embodiments, the input message I/O buffer 410 can store the interaction input message until the appropriate time to provide the interaction input message to the testing computer 170. Further, the input message I/O buffer 410 can ensure that the full message (e.g., an APDU command) is received by the mobile device 120, prior to transmitting the interaction input message to the testing computer 170. In this case, the testing computer 170, which may operate faster than the access device 125 and the mobile device 120, may not attempt to respond to the interaction input message prior to receiving the entirety of the message, and then potentially logging that the received message included an error and thus later creating an incorrect interaction report.

In some embodiments, at step C, the TCP/IP thread may be waiting until the NFC thread moves the interaction input message from the access device 125 to the input message I/O buffer 420. For example, the TCP/IP thread may wait at step C after the last time that step B and step 3 were performed (e.g., during a previous test interaction).

At step A, of the TCP/IP thread, the mobile device 120 (e.g., the input message I/O buffer 410) may forward the interaction input message to the testing computer 170. Step A may occur after step 1, for example, when the TCP/IP thread determines that the input message I/O buffer 410 is filled in by the NFC thread. For example, the mobile device 120 can retrieve the full interaction input message from the input message I/O buffer 410, and then transmit the full interaction input message to the testing computer 170. The TCP/IP thread can move data (e.g., the interaction input message) from the input message I/O buffer 410 to the testing computer 170.

The testing computer 170 may receive the interaction input message and may use currently operating interaction device logic to determine an interaction output message based on the interaction input message. The interaction output message may be an APDU response. The interaction device logic utilized by the testing computer 170 can include any suitable interaction device logic described herein and/or as known to one of skill in the art.

In some embodiments, the testing computer 170 can generate incorrect data and then include the incorrect data into the interaction output message. The incorrect data can comprise, for example, an incorrectly filled data field. The incorrect data can comprise any suitable data that is included and/or excluded intentionally by the testing computer 170, as described herein in further detail.

At step B, the testing computer 170 may send the interaction output message to the mobile device 120. The interaction output message may be an APDU response, for example, a select response, a read record response, a GPO response, a get data response, a generate application cryptogram response, or any other suitable message. The testing computer 170 can transmit the interaction output message to the mobile device 120 using any suitable communication channel. In some embodiments, the testing computer 170, being located at a central testing location, may communicate with the mobile device, being at a field-testing location, via a long-range communication channel. The long-range communication channel may be, for example, a TCP/IP communication channel.

Step 2 may occur after data is received from the testing computer 170. The NFC thread may continue, at step 2, once the TCP/IP thread transfers data (e.g., an interaction output message) from the testing computer 170 to the output message I/O buffer 420. Step 2 may indicate a waiting period for the NFC thread. After transferring the interaction input message from the access device 125 to the input message I/O buffer 410 of the mobile device 120, the NFC thread may wait until the TCP/IP thread transfers the interaction output message from the testing computer 170 to the output message I/O buffer 420 of the mobile device 120.

At step C, the TCP/IP thread may wait for the NFC thread to move data (e.g., a subsequent interaction input message) from the access device 125 to the input message I/O buffer 410 of the mobile device 120.

At step 3, resuming the NFC thread, the mobile device 120 may forward the interaction output message to the access device 125. For example, the mobile device 120 can retrieve the full interaction output message from the output message I/O buffer 420, and then transmit the full interaction output message to the access device 125.

After receiving the interaction output message, the access device 125 can continue with processing the interaction based on the received interaction output message. For example, the access device 125 may still need further information from the testing computer 170, and may then send one or more additional messages to the testing computer 170 (e.g., repeating some or all of steps 1-3 and A-C). For example, the access device 125 may transmit additional data (e.g., a second interaction input message) to the mobile device 120.

Once the access device 125 receives all the necessary interaction information, the access device 125 may use the information to send an authorization request message to an authorizing entity computer via a transport computer and a network processing computer. Alternatively, in some embodiments, the test interaction may be declined, by the access device 125, and stop at any time (e.g., during a test interaction that includes intentionally incorrect output messages).

During interaction processing and message exchanges, the access device 125 may keep track (e.g., store a log) of any processing errors, delays, or unusual circumstances. For example, the access device 125 may log unexpected or missing information from the testing computer 170, as well as what the access device 125 did in response. The access device 125 may also record information about how the authorization request message sent to the issuer was processed (e.g., authorized, not authorized, etc.).

In some embodiments, the access device 125 may then generate an interaction report for the first interaction. The interaction report can indicate whether or not the interaction was authorized. The interaction report can also include a communication log and information about how the interaction was processed, such as how the entire interaction system reacted to the specific interaction scenario, whether interaction processing was normal, and/or if there were unusual circumstances or errors. Each entity in the system (e.g., the authorizing entity computer, the network processing computer, the transport computer, etc.) may inform the access device 125 if any processing issues occurred (e.g., via an authorization response message).

After generating the interaction report, the access device 125 may send the interaction report to the mobile device 120, and the mobile device 120 can forward the interaction report to the testing computer 170. The access device 125 may prompt a user to present (e.g., tap or insert) the mobile device 120 to the access device 125 again to receive the interaction report. As a result, the testing computer 170 may obtain detailed information about how the interaction was processed from each component in the interaction system.

In some embodiments, after performing one or more interactions, the testing computer 170 can transmit an interaction report request message to the access device 125 via the mobile device 120. The access device 125 may thereafter generate the interaction report, generate an interaction report response message, and provide the interaction report response message to the testing computer 170 via the mobile device 120.

In some embodiments, the testing computer 170 may also create an interaction report for the first test interaction. For example, the testing computer 170 may record how the access device 125 responded to each response message (e.g., what information the access device 125 subsequently provided and/or requested). The testing computer 170 may also track any delays, unexpected events, inappropriate access device 125 actions, and interaction successes/failures.

Accordingly, the testing computer 170 may gather these interaction reports as well as other interaction reports for the same test interaction taking place at other access devices in other locations. As a result, the testing computer 170 can have a large amount of data for identifying trends and possible systemic errors.

In some embodiments, the testing computer 170 may also have access to interaction logs stored locally at other components in the interaction system (e.g., the authorizing entity computer, the network processing computer, the resource provider computer, or the transport computer). For example, the testing computer 170 may remotely access these computers and analyze an interaction database for each computer. The testing computer 170 may thereby be able to locate more information about interaction processing issues, determine whether the interaction data was correctly processed at each point in the system, and/or determine whether the authorization response messages and authorization request messages were correctly routed to and from the authorizing entity computer.

Having completed the first test interaction, the testing computer 170 may then initiate a second (e.g., a subsequent) interaction communication session with the access device 125 in order to run a second test interaction (e.g., for a second set of test logic). In some embodiments, the next test interaction can automatically initiate without removing the mobile device 120 from the access device 125. The process can be repeated any number of times until all of the desired test interactions and logic have been completed. In some embodiments, the same test interaction may be performed any suitable number of times, where the testing computer 170 can then later compare interaction reports from each test interaction.

Accordingly, the testing computer 170 can emulate specific types of interaction devices and a specific interaction scenarios from a remote location. Thus, the tests can be completed with access devices without having to physically distribute different test devices (e.g., a test credit card, a test prepaid card, a test debit card, etc.) to where those access devices are located.

As explained above, the test interactions can simulate a number of different interaction scenarios. This includes interaction scenarios where an interaction device is behaving unusually, for example, to observe how the access device 125 reacts. While many interaction scenarios are possible, some specific examples will now be described for illustrative purposes.

Test interactions can be designed to test whether different types of interaction devices work for a given access device 125 at a merchant location. For example, a first set of interaction device logic, implemented by the testing computer 170, can simulate a VISA credit card, and therefore the select response carries a VISA AID (application identifier). A second set of interaction device logic, implemented by the testing computer 170, for simulating a different type of credit card has a different type of AID. In yet another example, another set of interaction device logic can be designed to make sure that the access device 125 reacts appropriately for interaction devices that are only meant to work for online authorization. In this example, the interaction device logic may cause an ARQC (authorization request cryptogram) to be sent in the generate application cryptogram response. An ARQC can be, for example, a type of application cryptogram that is generated whenever the interaction device or the testing computer 170 requests online authorization during a card action analysis. Yet another set of interaction device logic for testing offline authorization only cards may send a TC (transaction certificate) in the generate application cryptogram response. Yet another set of interaction device logic that can be designed to test whether a tokenized interaction is processed appropriately. The interaction device logic can cause a payment token to be sent in the read record response. Yet another set of interaction device logic can be designed to test how an interaction network handles a certain type of cryptogram (e.g., cryptogram version number 22, or cryptogram version number 18). The interaction device logic can cause a "22" or "18" to be sent in the CVN (card verification number) field of the issuer application data (e.g., in a generate application cryptogram response).

In some embodiments, additional test interactions, according to interaction device logic performed by the testing computer 170, can be designed to target specific interaction processing functions at the transport computer, the resource provider computer, the network processing computer, and/or the authorizing entity computer.

Other sets of interaction device logic can be designed for negative test cases (e.g., test interactions with intentional errors). It is advantageous to know how the access device 125 (or other parts of the interaction system) react when an interaction device provides erroneous information. Negative test cases provide this information and enable users to make changes if needed. The following are examples of negative test cases.

As a first example, a set of interaction device logic can be designed to test the access device's response when the testing computer 170, emulating an interaction device, fails to provide a currency code. When emulating this scenario, the testing computer 170 can send mostly expected and normal APDU responses. However, one specific response message, the read record response, can omit the currency code data field.

For example, a normal read record response may be constructed as:
702B5713476173900101001 0d201220112345999999-91f5f200e4e616d653069
6e205265636f72649f420208409000

However, the read record response sent during the test interaction may be different in that it does not include the data field that is included in brackets here:
70265713476173900101001 0d201220112345999999-91f5f200e4e616d653069 6e205265636f67264[9f42020840]9000

Here, "9f42" (beginning of the missing data) can be a tag indicating that a currency code follows, "02" can be a length of the following currency code, and "0840" (remainder of missing data) can be the currency code.

The access device 125 may be designed such that it can continue with interaction processing as normal, even if this currency code is missing. Thus, this set of interaction device logic, performed by the testing computer 170, can be used to determine whether or not the access device 125 is actually able to proceed as intended when the currency code was not provided. It is possible that the access device 125 will instead reject the interaction, stall until a time-out occurs, experience a processing delay, or otherwise behave in an undesired manner. It is also possible that other components down the line (e.g., the authorizing entity computer, the transport computer, or the network processing computer) will have problems. In some embodiments, the testing computer 170 can observe any issues and take necessary corrective measures.

As a second example, a set of interaction device logic can be designed to test for responses of the access device 125 when the testing computer 170 provides invalid SDAD (Signed Dynamic Application Data). Similarly, when emulating this scenario, the testing computer 170 sends mostly expected and normal APDU responses. However, one specific response message, the "get processing options" response, can have a value in the SDAD field with an incorrect length, an incorrect format, or an otherwise inappropriate value. For example, a normal SDAD field may be constructed as "9F4B404B54 . . . " However, the SDAD field could be erroneously encoded, and be changed by omitting the data "4B54" such that the SDAD data field in the test interaction's GPO response is "9F4B3D . . . ". Again, it may be desirable for the access device 125 (and other parts of the interaction system) to react to this situation (or other situations involving erroneous or messing data) in a certain way. For example, the access device 125 to continue with the interaction, to decline the interaction, to ask for more information from the testing computer 170, to flag the incorrect SDAD in an authorization request message, or to take any other suitable action. The testing computer 170 or other component in the interaction system may log what happens so that the testing computer 170 can observe the results at a later time.

Embodiments of the invention have a number of advantages. For example, in some embodiments, a testing computer (in combination with a local mobile device) can be used to test how an access device reacts to any suitable number of different interaction devices and interaction scenarios, all from a remote location. Thus, there is no need to use multiple different physical sample interaction devices for testing, as all the tests can be conveniently conducted using the testing computer and mobile device.

Additionally, when new interaction devices are made or other updates take place, their logic instructions can be uploaded to the testing computer. As a result, there is again no need for distributing new physical testing devices to each access device location. Further, the most up-to-date interaction devices and test cases can be used immediately for testing, without waiting for the distribution of any physical devices to the locations where the access devices reside.

Embodiments of the invention also advantageously simplify the testing process, so that a skilled technical worker is not needed to conduct test interactions. A mobile device at a resource provider location can be loaded with necessary software for communicating with the testing computer. The mobile device can then be used to test the access device's operation.

Embodiments of the invention further advantageously allow interaction device logic to be tested without exposing the interaction device logic, programming, or other configurations to risks of being stolen or lost. The testing computer and card logic can remain in a secure testing facility, and thus do not need to be transported outside where it might be compromised. In some cases, only electronic messages (e.g., APDU responses) may be transmitted outside the test facility, while the computer logic that created the message may never be exposed. As a result, security is improved and cards or other interaction devices with confidential logic can be tested.

Embodiments of the invention also advantageously enable a central testing computer to create its own interaction reports because it can be directly involved with test interactions. As a result, there may no longer be a need for a technician to send back test reports (e.g., by physically returning test cards and/or compiling data).

A computer system will now be described that may be used to implement any of the entities or components described herein. Subsystems in the computer system are interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

As described, the inventive service may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

Any of the software components or functions described in this application may be implemented as software code to be executed by a processor using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one," unless specifically indicated to the contrary.

What is claimed is:

1. A method comprising:
receiving, by a testing computer, an interaction input message from a mobile device via an Internet communication channel, wherein the mobile device previously received the interaction input message from an access device for an interaction, the mobile device being in short-range communication with the access device via NFC (near field communications);
determining, by the testing computer, using a set of logic emulating a specific type of interaction device, an interaction output message based on the interaction input message; and
transmitting, by the testing computer, the interaction output message to the mobile device, wherein the mobile device forwards the interaction output message to the access device.

2. The method of claim 1 further comprising:
generating, by the testing computer, an interaction report indicating how the access device functioned during the interaction.

3. The method of claim 1, wherein the set of logic emulating the specific type of interaction device emulates operation of a contactless smart card, an NFC sticker, a mobile phone, a payment ring, or a wearable device.

4. The method of claim 1, wherein the testing computer is in long-range communication with the mobile device.

5. The method of claim 1, wherein the interaction input message is an application protocol data unit command, wherein the interaction output message is an application protocol data unit response, and wherein the access device receives the application protocol data unit response and the access device determines that interaction data is included in the application protocol data unit command, and wherein the access device provides the interaction data to a resource provider computer.

6. The method of claim 1, wherein the mobile device comprises an input message I/O buffer and an output message I/O buffer.

7. The method of claim 6, wherein the mobile device stores the interaction input message into the input message I/O buffer and stores the interaction output message into the output message I/O buffer.

8. The method of claim 1 further comprising:
generating, by the testing computer, an incorrect data; and
including, by the testing computer, the incorrect data into the interaction output message.

9. The method of claim 1, whereby the interaction is performed without the specific type of interaction device.

10. A testing computer comprising:
a processor;
a memory; and
a computer-readable medium coupled to the processor, the computer-readable medium comprising code executable by the processor for implementing a method comprising:
receiving an interaction input message from a mobile device via an Internet communication channel, wherein the mobile device previously received the interaction input message from an access device for an interaction, the mobile device being in short-range communication with the access device via NFC (near field communications);
determining, using a set of logic emulating a specific type of interaction device, an interaction output message based on the interaction input message; and
transmitting the interaction output message to the mobile device, wherein the mobile device forwards the interaction output message to the access device.

11. The testing computer of claim 10 further comprising:
an interaction device logic module;
a communication module; and
an interaction report module.

12. The testing computer of claim 10, wherein the interaction input message is a first interaction input message, the interaction output message is a first interaction output message, the set of logic emulating the specific type of interaction device is a first set of logic emulating a specific type of first interaction device, and the interaction is a first interaction, and wherein the method further comprises:
receiving a second interaction input message from the mobile device, wherein the mobile device previously received the second interaction input message from the access device for a second interaction;
determining, using a second set of logic emulating a specific type of second interaction device, a second interaction output message based on the second interaction input message; and
transmitting the second interaction output message to the mobile device, wherein the mobile device forwards the second interaction output message to the access device.

13. The testing computer of claim 12, wherein the second set of logic emulating the specific type of second interaction device is the same as the first set of logic emulating the specific type of first interaction device.

14. The testing computer of claim 10, wherein the method further comprises:
generating an interaction report indicating how the access device functioned during the interaction.

15. The testing computer of claim 10, wherein the method further comprises:

generating an interaction report request message;

providing the interaction report request message to the mobile device, wherein the mobile device provides the interaction report request message to the access device, and wherein the access device generates an interaction report response message comprising an interaction report, and transmits the interaction report response message to the mobile device; and receiving the interaction report response message from the mobile device.

16. The testing computer of claim 10 wherein the access device determines that the interaction output message is received from an interaction device associated with the specific type of interaction device.

17. The testing computer of claim 10, wherein the method further comprises:

generating incorrect data; and including the incorrect data into the interaction output message.

18. The testing computer of claim 17, wherein the incorrect data comprises an incorrectly filled data field.

19. A mobile device comprising:

a processor;

a memory; and a computer-readable medium coupled to the processor, the computer-readable medium comprising code executable by the processor for implementing a method comprising:

receiving an interaction input message from an access device for an interaction, the access device being in short-range communication with the mobile device via NFC (near field communications);

transmitting the interaction input message to a testing computer via an Internet communication channel;

receiving an interaction output message from the testing computer, wherein the testing computer determines, using a set of logic emulating a specific type of interaction device, the interaction output message based on the interaction input message; and providing the interaction output message to the access device.

20. The mobile device of claim 19, wherein the method further comprises:

storing, in an output message I/O buffer module, the interaction input message; and storing, in an input message I/O buffer module, the interaction output message.

* * * * *